United States Patent [19]
Yanagisawa et al.

[11] Patent Number: 5,635,312
[45] Date of Patent: Jun. 3, 1997

[54] LAYER-BUILT CHEMICAL CELL DEVICE

[75] Inventors: Shuichi Yanagisawa; Takashi Yamada; Taishi Tsuji; Fumio Matsui, all of Saitama-ken, Japan

[73] Assignee: Pioneer Electronic Corporation, Tokyo, Japan

[21] Appl. No.: 571,134

[22] Filed: Dec. 12, 1995

[30] Foreign Application Priority Data

Dec. 13, 1994 [JP] Japan .................................. 6-332460

[51] Int. Cl.$^6$ .................................................. H01M 4/00
[52] U.S. Cl. .................... 429/94; 429/131; 429/132; 429/133; 429/136; 429/157; 429/162; 429/218
[58] Field of Search ............................. 429/131, 132, 429/133, 136, 157, 162, 218, 94

[56] References Cited

U.S. PATENT DOCUMENTS

| | | | |
|---|---|---|---|
| 4,830,940 | 5/1989 | Keister et al. | 429/219 |
| 5,147,737 | 9/1992 | Post et al. | 429/94 |
| 5,434,017 | 7/1995 | Berkowitz et al. | 429/94 |
| 5,439,760 | 8/1995 | Howard et al. | 429/219 |
| 5,478,668 | 12/1995 | Gozdz et al. | 429/162 |
| 5,486,215 | 1/1996 | Kelm et al. | 429/94 |
| 5,500,292 | 3/1996 | Muranaka et al. | 429/218 |
| 5,549,717 | 8/1996 | Takeuchi et al. | 29/623.2 |

*Primary Examiner*—Bruce F. Bell
*Attorney, Agent, or Firm*—Nikaido, Marmelstein, Murray & Oram LLP

[57] ABSTRACT

There is provided a layer-built chemical cell device, comprising a positive electrode including a current collecting material and an active substance, a negative electrode including another current collecting material and another active substance, an electrolyte and a separator both interposed between the positive electrode and the negative electrode. In such a layer-built cell device, the positive electrode and the negative electrode are in a belt-like shape, and are folded upon each other in a manner such that one electrode is always faced on both sides thereof with the other electrode, so as to form an electrode pair.

7 Claims, 6 Drawing Sheets

PRIOR ART

LAYER-BUILT CHEMICAL CELL DEVICE

BACKGROUND OF THE INVENTION

The present invention relates generally to a cell device, and more specifically to a chemical cell device having a positive electrode, a negative electrode, and an electrolyte, capable of generating electricity through chemical reactions, and also capable of electrically charging and discharging.

A chemical cell device usually includes current collecting materials permitting electron movement so as to effect the flowing of electric current, a positive electrode and a negative electrode each comprising an active substance capable of electrically charging or discharging by collecting or producing electrons, an amount of electrolyte allowing smooth flowing of electric current and constituting another place for electrically charging and discharging by adjusting the amount of ions in the electrolyte, and a porous insulating separator provided to prevent short circuit possibly formed between the positive electrode and the negative electrode, but not to impede ion conductivity in the electrolyte.

In order to improve the efficiency of a chemical cell, i.e., to obtain a larger charging capacity for the above-described chemical cell, it is usually necessary to prepare a mutually-facing electrode pair both of which have a large area to obtain a large capacity for electric charging and discharging, also it is necessary to render the distance between the two electrodes as small as possible so as to reduce the internal resistance.

However, in practical use, the size of a chemical cell is often restricted. To satisfy the above-mentioned requirements, it has been suggested to utilize a kind of layer-built cell because it functions as a high-efficient cell without the necessity of making the cell in large size.

One simple form of a layer-built cell comprises a plurality of positive electrodes and a plurality of negative electrodes, all of which are processed into a same form of thin plate and are arranged alternatively so as to form a layer-built structure. Then, all the positive electrodes are connected together by a lead wire, and all the negative electrodes are connected together by another lead wire. In this way, a plurality of electrode pairs are formed, and each electrode pair serves as a single cell. In fact, these electrode pairs may be considered as having connected in parallel, so that the overall capacity of the layer-built cell will increase by increasing such electrode pairs. But, in such a layer-built cell, since it is extremely difficult to completely unify the capacity and the resistance of individual electrodes, there occurs a problem that an electric load is apt to concentrate on one position, causing a damage to the cell device itself.

Figure 5:
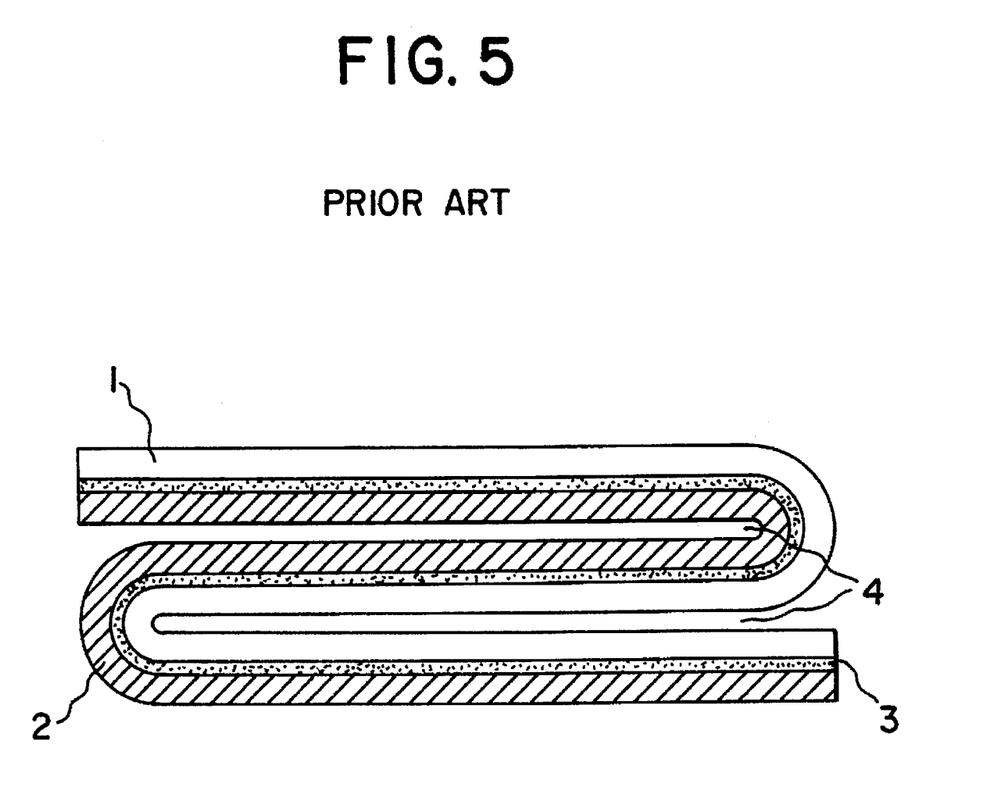
FIG. 5 is a cross sectional view illustrating a conventional electrode pair.

To overcome the above problem, it is necessary to have all the positive electrodes and all the negative electrodes respectively formed in a continuous integral state, to obtain an electrode pair as shown in FIG. 5. In FIG. 5, reference numeral 1 represents an electrode (positive electrode), 2 represents another electrode (negative electrode), 3 represents a separator interposed between the electrode 1 and the electrode 2, 4 represents mutually-overlaid portions of an identical electrode. As illustrated in FIG. 5, the electrode pair is formed by first letting one electrode lie on top of the other and then folding the two mutually-overlaid electrodes in a predetermined manner as shown in the drawing. Since the two electrodes are all formed in a continuous integral state, it is sure to prevent the electric lead from concentrating on one position.

But, as is understood from FIG. 5, since different portions of a same electrode are forced to face each other, it will be difficult to truly improve the electrical capacity of such a layer-built cell.

Figure 6:
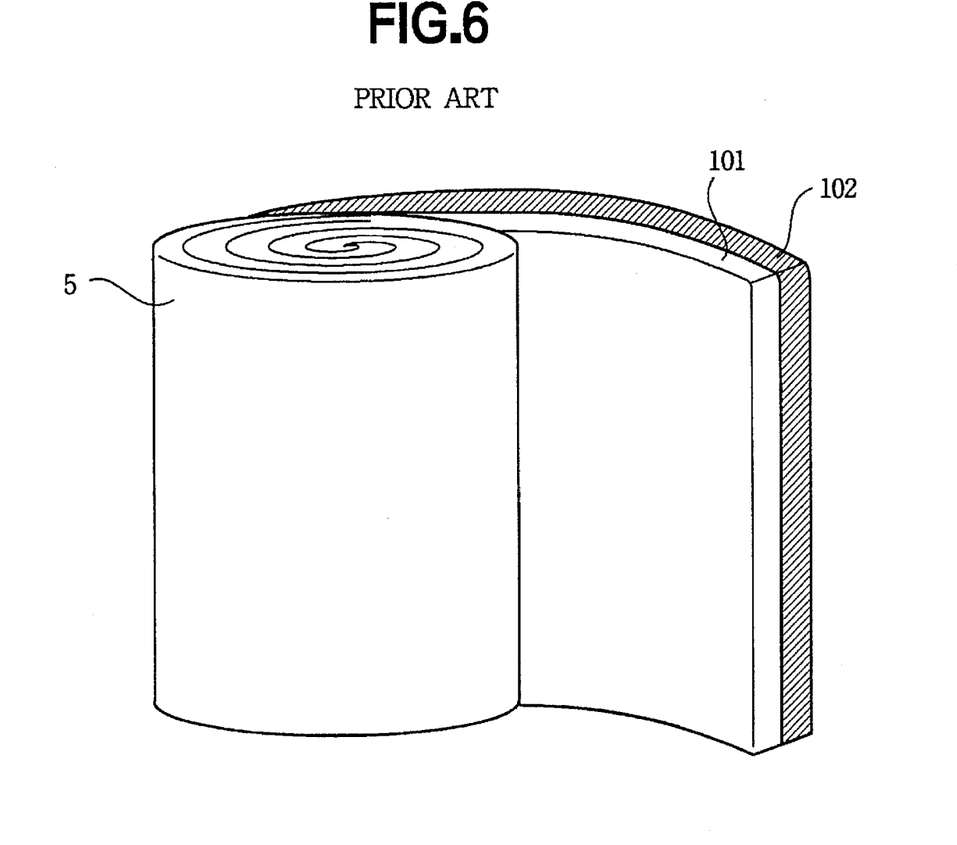
FIG. 6 is a perspective view illustrating another conventional electrode pair.

In order to avoid the problem of the layer-built cell as shown in FIG. 5, it has been suggested to utilize another layer-built electrode pair 5 as shown in FIG. 6. In FIG. 6, the layer-built electrode pair 5 comprises an electrode 101 (positive electrode) and another electrode 102 (negative electrode) which are laminated together and rolled up so as to form the layer-built cylindrical structure. Either the electrode 101 or the electrode 102 is provided on both sides thereof with a seperator layer (not shown). In the layer-built electrode pair 5 which is constructed in a manner as shown in FIG. 6, each of the electrodes 101 and 102 is formed as a continuous integral body, with one electrode facing the other throughout the whole structure. After incorporating one or more such electrode pairs 5 into a package and filling the package with an electrolyte, another type of layer-built cell different from that shown in FIG. 5 may be obtained.

Figure 7:
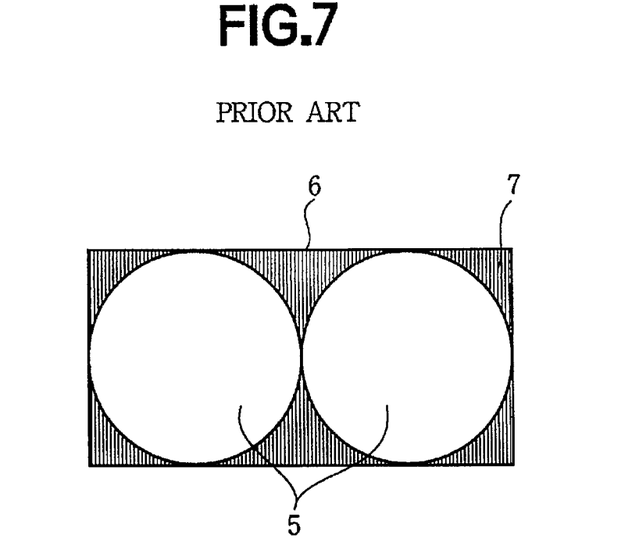
FIG. 7 is a top plane view illustrating a chemical cell in which two electrode pairs of FIG. 6 are received in a rectangular parallelepiped package.

FIG. 7 indicates that two cylindrical electrode pairs 5 are received in a rectangular parallelepiped package 6, with several vacant spaces 7 formed between the package walls and the electrode pairs 5.

However, a cell structure formed in a manner as shown in FIG. 7, presents a problem that about 20 per cent of the internal space will be unused. To solve this problem, it has been suggested that the shape of the electrode pairs be changed so as to conform to that of the package, or the shape of the package be changed so as to conform to that of the electrode pairs. But, since a product cell is usually received and packed into a rectangular parallelepiped case, such a solution to the above problem has been proved to be neither economical in cost nor practical in use.

SUMMARY OF THE INVENTION

An object of the present invention is to provide a layer-built chemical cell device having a larger electric capacity and a higher efficiency as compared with conventional layer-built chemical cell devices.

Another object of the present invention is to provide a layer-built chemical cell device in which only one electrode pair is needed and can be easily and reasonably received in a rectangular parallelepiped package, simplifying manufacturing process for producing a layer-built chemical cell device.

According to the present invention, there is provided a layer-built chemical cell device, which comprises a positive electrode including a current collecting material and an active substance, a negative electrode including another current collecting material and another active substance, an electrolyte and a separator both interposed between the positive electrode and the negative electrode. In such a layer-built chemical cell device, the positive electrode and the negative electrode are in a belt-like shape, and are folded upon each other in a manner such that one electrode is always faced on both sides thereof with the other electrode, so as to form an electrode pair.

In one aspect of the present invention, said electrode pair may be formed by first arranging the two belt-like positive and negative electrodes so that one electrode is orthogonal to the other, then folding the two electrodes in a manner such that the two electrodes are alternatively folded upon one another for predetermined times.

In another aspect of the present invention, each of the belt-like positive and negative electrodes is formed with a number of cutting notches which subsequently serve as folding positions. Therefore, said electrode pair may also be formed by first bring together the two electrodes in a manner such that the two electrodes are alternatively overlaid with each other through said cutting notches, then folding the two electrodes at cutting notches.

The above objects and features of the present invention will become more understood from the following description with reference to the accompanying drawings.

BRIEF DESCRIPTION OF DRAWINGS

FIG. 1c is an enlarged cross sectional view illustrating in detail the electrode pair of FIG. 1a.

FIG. 2a is an explanatory view illustrating a first step in making the electrode pair of FIG. 1a.

FIG. 2b is an explanatory view illustrating a second step in making the electrode pair of FIG. 1a.

FIG. 2c is an explanatory view illustrating a third step in making the electrode pair of FIG. 1a.

FIG. 3a is an explanatory view illustrating how to treat folding positions on each electrode of the electrode pair of FIG. 1a.

FIG. 3b is an explanatory view illustrating how to treat folding positions on each electrode of the electrode pair of FIG. 1a.

DETAILED DESCRIPTION OF THE PREFERRED EMBODIMENTS

Figure 1A:
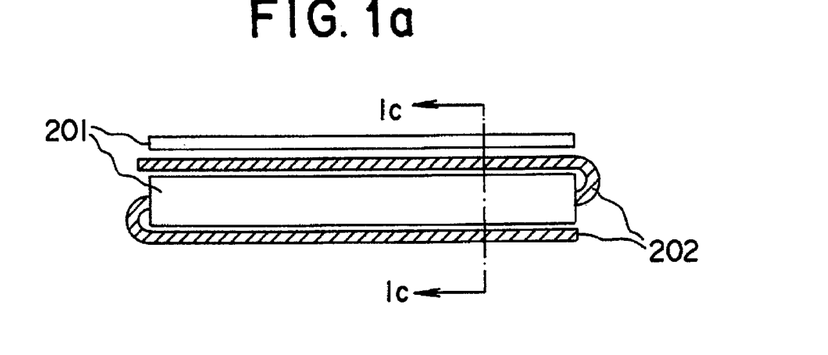
FIG. 1a is an elevational view illustrating a part of an improved electrode pair according to the first embodiment of the present invention.
Figure 1B:
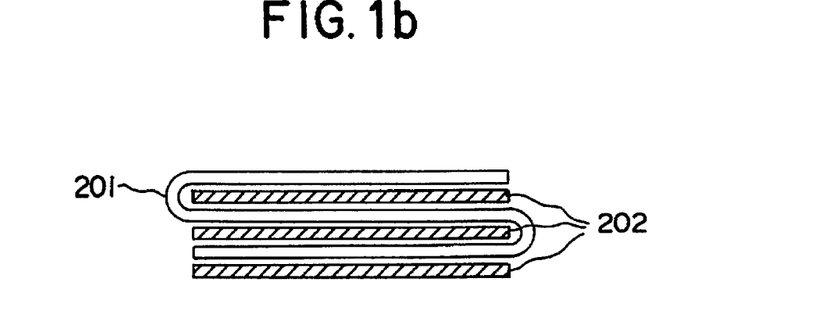
FIG. 1b is a cross sectional view taken along line A—A in FIG. 1a, illustrating the same part of the improved electrode pair.

Referring to FIG. 1a which is an elevational view illustrating a part of an improved electrode pair according to the first embodiment of the present invention and FIG. 1b which is a cross sectional view taken along line A—A in FIG. 1a, reference numeral 201 represents a positive or negative electrode, 202 represents another electrode different from the electrode 201.

Figure 1C:
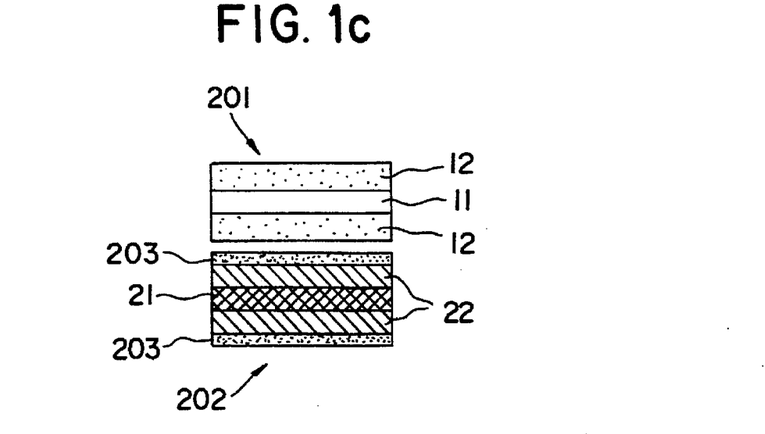

Referring to FIG. 1c which is an enlarged cross sectional view illustrating in detail the improved electrode pair of FIG. 1a, reference numeral 11 represents a current collecting material for use with the electrode 201 which permits the movement of electrons so as to facilitate the generating and vanishing of electrons on the electrode 201, reference numeral 12 represents an active substance for use with the electrode 201 which permits accumulation and emission of electrons or cations so as to accumulate or emit electric energy. Similarly, reference numeral 21 represents a current collecting material for use with the electrode 202 which permits the movement of electrons so as to facilitate the generating and vanishing of electrons on the electrode 202, reference numeral 22 represents an active substance for use with the electrode 202 which permits accumulation and emission of electrons or cations so as to accumulate or emit electric energy. Either the electrode pair 201 or the electrode pair 202 is provided on both sides thereof with separator layers 203 which prevent the formation of short circuit possibly formed between the two electrodes 201 and 202, but will not impede ions passing therethrough.

The production of a layer-built chemical cell device having the electrode pair of FIG. 1 according to the first embodiment of the present invention will be described in detail as follows.

At first, the current collecting material 11 for use with the electrode 201 and the current collecting material 21 for use with the electrode 202 are prepared such that both of them are in a belt-like shape. It is necessary that the current collecting materials 11 and 12 have the same surface area so that there will not be any unused portions after they are folded upon each other in a predetermined manner.

Then, the current collecting materials 11 and 21 are coated with active substances 12 and 22 which are properly selected corresponding to the respective electrodes 201 and 202 so that they are different from each other. Namely, each of the current collecting materials 11 and 21 is provided on both sides thereof with thin films of an active substance, thereby resulting in the desired electrodes 201 and 202 as shown in FIG. 1c. Subsequently, either the electrode 201 or the electrode 202 is further provided on both sides thereof with a separator layer 203 to prevent the formation of a possible short circuit between the electrodes 201 and 202.

Figure 2:
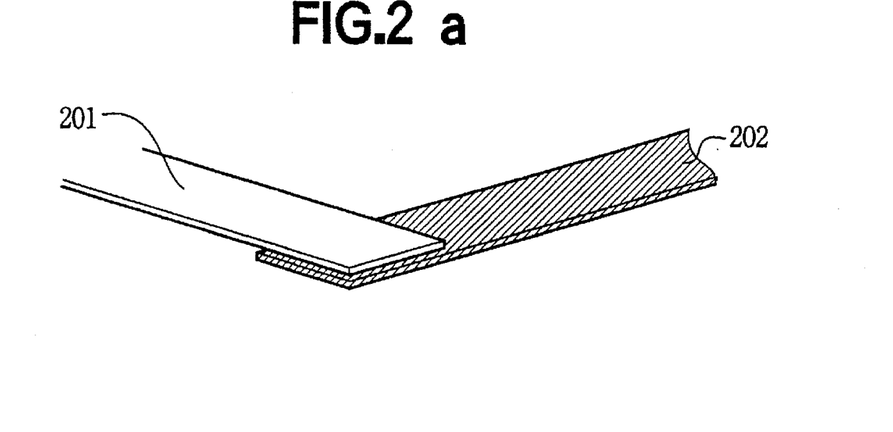

FIGS. 2a–2c shows how to fold the electrodes. As illustrated in FIG. 2a, the electrode 201 and the electrode 202 are arranged in a manner such that they become orthogonal to each other and are intersected with each other at their front end portions. Then, as illustrated in FIG. 2b, the electrode 202 is folded upwardly against the electrode 201.

Subsequently, as illustrated in FIG. 2c, the electrode 201 is folded upwardly against the electrode 202. In this way, the electrode pair as shown in FIGS. 1a and 1b may be obtained, with both sides of one electrode always facing the other electrode throughout the entire structure.

Although the size of thus formed electrode pair depends upon the width of each belt-like electrode and the number of the foldings on each electrode, it is possible to obtain a desired shape for the electrode pair by properly changing the length and width of the two electrodes 201 and 202.

While the electrodes 201 and 202 are being folded in a manner as illustrated in FIGS. 2b and 2c, wrinkling and cracking might occur at folding positions on the electrodes, resulting in the peeling or falling of the active substances coated on the surfaces of these electrodes. This, however, will cause a deterioration in the quality of a chemical cell.

Figure 3:
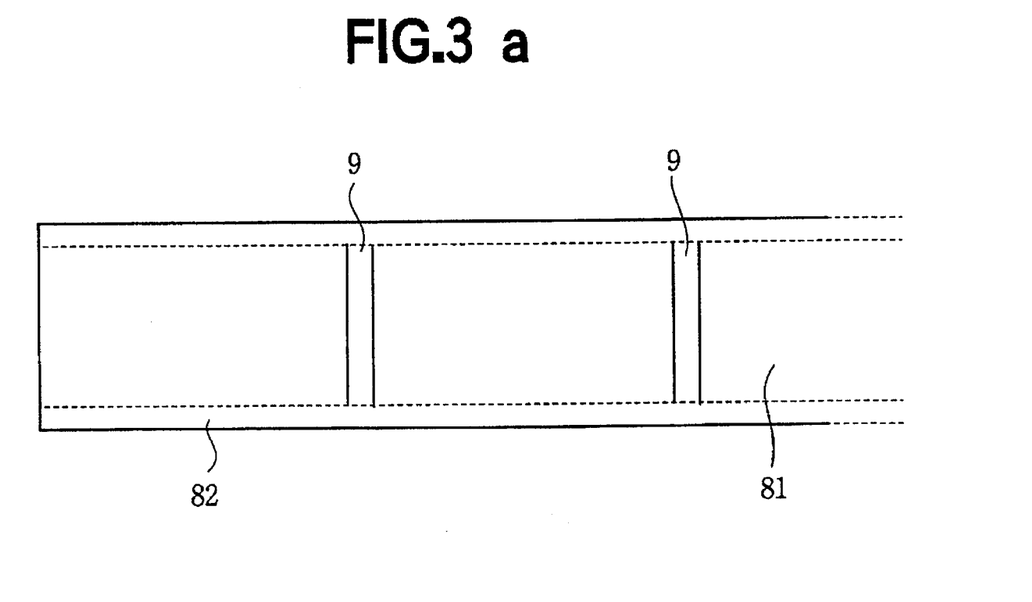

In order to avoid the wrinkling and cracking, it is preferred to prepare the two electrodes in a manner as shown in FIGS. 3a and 3b. In FIG. 3a, reference numeral 81 represents electrode areas coated with an active substance, whereas reference numeral 82 represents areas not coated with an active substance. Reference numeral 9 represents slits formed on the electrodes which later serves as folding positions. Further, in FIG. 3b, reference numeral 10 represents folding positions which are not coated with an active substance but have been water repellent treated.

Although the folding positions 9 and 10 shown in FIGS. 3a and 3b do not serve as effective portions for a chemical cell since they are not coated with active substances, it becomes possible to prevent quality deterioration caused by the peeling or falling of the active substance from the current collecting materials.

After the electrode pair comprising the electrodes 201 and 202 as shown in FIG. 1, obtained in a manner as described above, has been received into a package (not shown) with a lead wire leading from each current collecting material 11, 21, followed by filling the package with a proper electrolyte and sealing the same, a layer-built chemical cell device according to the first embodiment of the present invention is thus completed.

Figure 4:
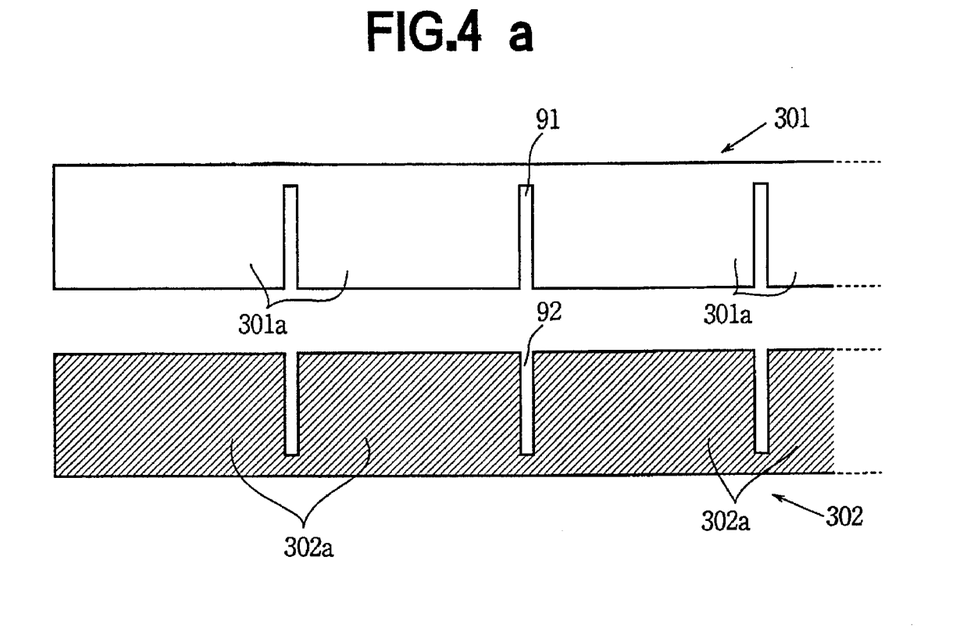
FIG. 4a is a plane view illustrating two electrodes which are subsequently brought together to constitute another improved electrode pair according to the second embodiment of the present invention.
FIG. 4b is a plane view illustrating the two electrodes of FIG. 4a which have been brought together in such a manner that the two electrodes lie alternatively one upon another.
FIG. 4c is a side view illustrating the improved electrode pair according to the second embodiment of the present invention.

FIGS. 4a–4c illustrate another improved electrode pair and indicate how it can be produced, according to the second embodiment of the present invention.

At first, two current collecting materials for a positive electrode 301 and a negative electrode 302 respectively, are prepared such that they have the same width and length as each other. Then, each of the current collecting materials is coated on both sides thereof with an active substance. Subsequently, either the current collecting material for the electrode 301 or the current collecting material for the electrode 302 is further provided on both sides thereof with separator layers, thereby obtaining electrodes 301 and 302. Afterwards, cutting notches 91 and 92 are made on the two electrodes 301 and 302 respectively, at a predetermined interval in the longitudinal directions thereof, so that the two electrodes are divided into a number of portions 301a, 302a. However, it is necessary that the cutting notches 91 formed on the electrode 301 should be coincident with the cutting notches 92 formed on the electrode 302 if the two electrodes are brought together with one lying on the top of the other. Further, the total length of two corresponding cutting notches 91 and 92 should be greater than the width of each electrode.

In practice, the above notches 91 and 92 may also be formed beforehand on the respective current collecting materials, prior to coating the same with active substances. In fact, in order to prevent the peeling, falling, cracking and wrinkling of the active substances, it is desirable to in advance form the notches 91 and 92 on the respective current collecting materials before the coating of the active substances.

Where the notches 91 and 92 are in advance formed on the respective current collecting materials before the active substance coating, cutting notches of the separator layers may be formed thereon in the same size and positions as the cutting notches of either current collecting material, prior to attaching the separator layers on to both sides of the current collecting material. Alternatively, the cutting notches of the separator layers may be formed by first providing belt-like separator layers on both sides of one electrode, or introducing the electrode into a long and narrow bag-like separator material, then making desired cutting notches such that they are coincident with the cutting notches already formed on that electrode.

Referring to FIG. 4b, the electrodes 301 and 302 are brought together so as to be alternatively overlaid with each other through corresponding cutting notches 91 and 92. Namely, after the two electrodes 301 and 302 have been brought together into a position as illustrated in FIG. 4b, the leftmost divided portion 301a of the electrode 301 lies over the leftmost divided portion 302a of the electrode 302, whilst the second divided portion 302a (adjacent to the leftmost one) of the electrode 302 lies over the second divided portion 301a (adjacent to the leftmost one) of the electrode 301. In this way, the above divided portions 301a and 302a of the two electrodes lie alternatively one upon another.

Subsequently, the two electrodes 301 and 302 alternatively overlaid with each other, are folded at corresponding cutting notches 91, 92, so as to be formed into a relation as shown in FIG. 4c, thereby obtaining an improved electrode pair according to the second embodiment of the present invention.

As illustrated in FIG. 4c, when the thus obtained electrode pair is viewed from one side, it is seen that the electrode 302 is always somewhat closer to the front than the electrode 301.

After the electrode pair comprising the electrodes 301 and 302, obtained as described in FIGS. 4a–4c, has been received into a package (not shown) with a lead wire leading from each current collecting material, followed by filling the package with a proper electrolyte and sealing the same, a layer-built chemical cell device according to the second embodiment of the present invention is thus completed.

Hereinafter, description will be given to substances and materials used in the layer-built chemical cell devices according to the first and second embodiments of the present invention.

Although the following description concerns specifically the substances and materials particularly for use in a secondary cell, in the present invention it is also possible to employ other substances and materials generally for use in a primary cell.

In both the first and second embodiments of the present invention, a current collecting materials for use in a positive electrode is a metal having a low ionization tendency. Such a metal may be a simple substance such as aluminium, cobalt, nickel, iron, or titanium, ere, or an alloy such as stainless steel or brass. When used as a current collecting material, it is necessary to have the metals formed into a metal foil. In order to obtain a desired current collecting efficiency and to ensure that the current collecting material can be easily folded, the thickness of the metal foil is preferably 15–30 μm.

Further, in both the first and second embodiments of the present invention, an active substance coated on both sides of a current collecting material for a positive electrode, may be an inorganic substance such as $LiMnO_2$, $LiNiO_2$, $LiCoO_2$, $V_2O_5$, $V_6O_{13}$, $TiS_2$, $MoS_2$, $NbSe_3$, $Cr_2O_5$, $Cr_3O_8$, or $LiAlCl_4 \cdot 3SO_2$, etc. However, since these inorganic substances do not possess a sufficiently high electric conductivity, it is necessary to mix a conductive material such as black lead or acetylene black into one of the above inorganic substances, using a binder such as polyvinylidene fluoride or Tefon for binding the conductive material with the inorganic substance. Alternatively, instead of mixing a conductive material and using a binder, an electrically conductive high polymer such as polyaniline, polyacene, polythiophene, polypyrrole, or polyazulene may be mixed into one of the above inorganic substances. Furthermore, it is also possible to independently use any one of the above electrically conductive high polymers as an active substance for a positive electrode.

On the other hand, in both the first and second embodiments of the present invention, a current collecting materials for a negative electrode is a metal having a higher ionization tendency than a current collecting material of a positive electrode. Such a metal may be a simple substance such as copper, gold, or platinum, etc., or an alloy such as stainless steel. Similarly, to be used as a current collecting material, it is necessary to have the metal formed into a metal foil. Also, in order to obtain a desired current collecting efficiency and to ensure that the current collecting material can be easily folded, the thickness of the metal foil is preferably 15–30 μm.

Further, in both the first and second embodiments of the present invention, an active substance coated on both sides of a current collecting material for a negative electrode, may be lithium, or lithium-aluminium alloy. Alternatively, such an active substance may be black lead, coke, pyrolytic carbon, carbon fiber, carbon black, polymer burned product, or mesocarbon microbeads, etc., in combination with the use of a binder.

A separator layer used in the first and second embodiments of the present invention is a material having a high insulativity, such as polyethylene, polypropylene, Vinyon, rayon, polyamide, or polyolefin. In order for ions to pass through the separator layer, it is preferred to use a porous material or use a material in a non-waven fabric form. To ensure the easy passing of the ions therethrough and maintain a desired high insulativity, such a porous material or a non-waven fabric should have a pore diameter of 0.05–0.25 μm.

Two separator layers may be respectively bonded on both sides of either the positive electrode or the negative electrode, prior to folding the two electrodes into a desired electrode pair. Alternatively, the two separator layers may be provided on both sides of either electrode by introducing the electrode into a bag-like separator material to cause the both sides of the electrode to adhere to the separator material. Moreover, it is also possible to interpose a small separator layer into each space between every two portions of two different electrodes lying one upon another after the two electrodes have been folded into a desired form.

However, in order to ensure a desired insulativity and foldability for the separator layers, the thickness of each separator layer is preferably 20–30 μm.

Finally, in the present invention, an electrolyte used in the layer-built chemical cells of both the first and second embodiments, may be a liquid, a photopolymer, or a gelatinized or even a solidified substance. As a solute for the electrolyte, it is allowed to utilize a lithium-containing salt such as $LiPF_6$, $LiBF_4$, $LiClO_4$, $LiAsF_6$, $LiSO_3CF_3$, or $LiN(CF_3SO_2)_2$, etc. As a solvent for the electrolyte, in order to prevent a reaction of lithium with water, it desirable to employ a non-aqueous solvent such as ethylene carbonate, propylene carbonate, dimethyl carbonate, diethyl carbonate, methylethyl carbonate, γ-butyrolactone, 1,2-dimethoxyethane, dimethyl sulfoxide, sulfolane, N,N-dimethylformamide, acetonitrile, nitromethane, tetrahydrofuran, 1,3-dioxolane, 2-methoxytetrahydrofuran, diethylether, ethyl propionate, dimethoxypropane, in a single or a properly mixed form. However, the concentration of a solute in a properly prepared electrolytic solution should be 1–2M.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A layer-built chemical cell device, comprising:

a positive electrode including a current collecting material and an active substance;

a negative electrode including another current collecting material and another active substance;

an electrolyte and a separator layer both interposed between the positive electrode and the negative electrode;

wherein the positive electrode and the negative electrode are in a belt shape, and are folded upon each other in a manner such that one electrode is always faced on both sides thereof with the other electrode, to form an electrode pair.

2. The layer-built chemical cell device according to claim 1, wherein each of the positive and negative electrodes is formed by coating a current collecting material with an active substance.

3. The layer-built chemical cell device according to claim 1, wherein said electrode pair is formed by first arranging the two positive and negative belt electrodes so that one electrode is orthogonal to the other, then folding the two electrodes in a manner such that the two electrodes are alternatively folded upon one another for a set number of times.

4. The layer-built chemical cell device according to claim 3, wherein each of the positive and negative belt electrodes is formed with a number of slits on its folding positions.

5. The layer-built chemical cell device according to claim 3, wherein each of the positive and negative belt electrodes is free of an active substance on its folding positions.

6. The layer-built chemical cell device according to claim 1, wherein each of the positive and negative belt electrodes is formed with a number of cutting notches which subsequently serve as folding positions.

7. The layer-built chemical cell device according to claim 1 or 6, wherein said electrode pair is formed by first bring together the two electrodes in a manner such that the two electrodes are alternatively overlaid with each other through said cutting notches, then folding the two electrodes at the cutting notches.

* * * * *